United States Patent
Kuo et al.

(10) Patent No.: US 8,471,487 B2
(45) Date of Patent: Jun. 25, 2013

(54) LIGHT EMITTING MODULE DRIVING CIRCUIT AND RELATED METHOD

(75) Inventors: Ming-Ying Kuo, Hsin-Chu (TW); Chung-Wei Lin, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 391 days.

(21) Appl. No.: 12/977,033

(22) Filed: Dec. 22, 2010

(65) Prior Publication Data
US 2012/0161634 A1      Jun. 28, 2012

(51) Int. Cl.
*H05B 41/16*     (2006.01)
(52) U.S. Cl.
USPC ........ 315/247; 315/291; 315/185 S; 315/307; 315/312

(58) Field of Classification Search
USPC ............ 315/247, 224, 246, 209 R, 225, 291, 315/297, 307–326
See application file for complete search history.

(56) References Cited

U.S. PATENT DOCUMENTS
2012/0081017 A1*   4/2012   Darshan et al. ................ 315/193

* cited by examiner

*Primary Examiner* — Tuyet Thi Vo
(74) *Attorney, Agent, or Firm* — Winston Hsu; Scott Margo

(57) ABSTRACT

A light emitting module driver circuit utilized for driving a light emitting module includes a voltage dividing module, a short circuit detection module, and a driving module. A method of performing short circuit protection in the light emitting module driver circuit includes disabling the driving module during a dimming off cycle of the light emitting module driver circuit, enabling the voltage dividing module during the dimming off cycle, dividing a voltage of the light emitting module to generate a divided voltage during the dimming off cycle, and generating a short circuit protection signal according to the divided voltage during the dimming off cycle.

11 Claims, 4 Drawing Sheets

LIGHT EMITTING MODULE DRIVING CIRCUIT AND RELATED METHOD

BACKGROUND OF THE INVENTION

1. Field of the Invention

The present invention relates to a light emitting module driving circuit and related method, and particularly to a light emitting module driving circuit with short circuit protection and related method.

2. Description of the Prior Art

Light emitting diodes (LEDs) are becoming a popular light source used in many devices, including liquid crystal displays (LCDs), traffic lights, and indoor/outdoor lighting elements. Driver circuits for driving LEDs are now required to drive greater numbers of LEDs in series. Thus, the driver circuits must operate over a very large voltage range, requiring integrated components of the driver circuits to be designed to withstand high voltages. Using high-voltage, external discrete components allows more flexibility in integrated circuit design of the driver circuits. However, even when high-voltage discrete components are employed to allow the driver circuit to operate over the very large voltage range, short circuit detection still requires internal integrated circuit components to be designed with high voltages in mind.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
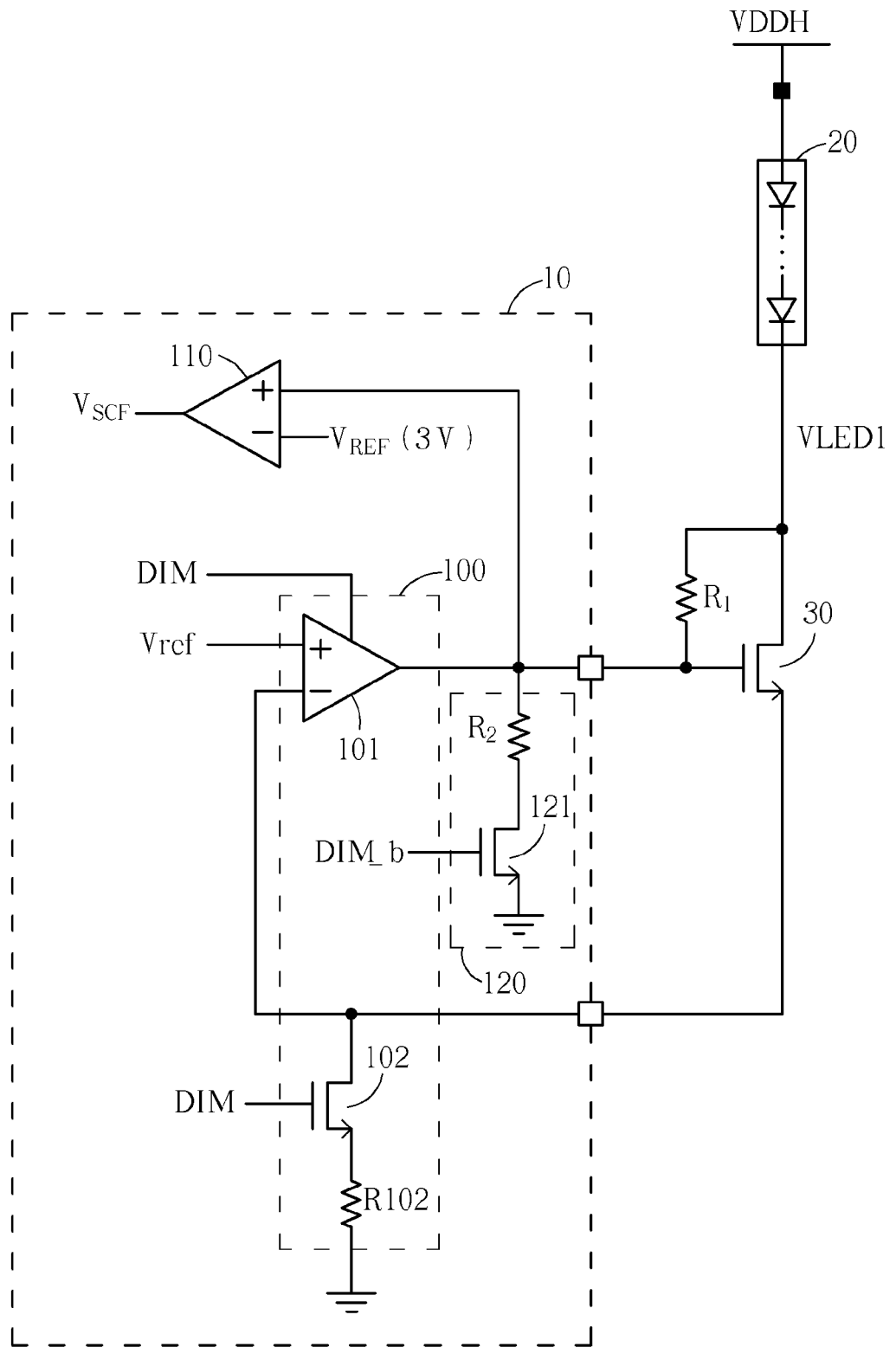
FIG. 1 is a diagram of a light emitting module driving integrated circuit utilized for driving a light emitting module according to an embodiment.

Please refer to FIG. 1, which is a diagram of light emitting module driving integrated circuit (IC) 10 utilized for driving light emitting module 20 according to an embodiment. Light emitting module driving IC 10 drives light emitting module 20 by controlling conduction of switch 30. A first terminal of switch 30 is coupled to light emitting module 20. Switch 30 may be a transistor, such as a metal-oxide-semiconductor (MOS) transistor. Light emitting module driving IC 10 controls conduction of switch 30 by varying voltage applied to a second terminal, e.g. a gate electrode, of switch 30. Light emitting module 20 is coupled to supply voltage VDDH.

Light emitting module driving IC 10 comprises driving module 100, short circuit detection module 110, and protection circuit 120. Driving module 100 is coupled to the second terminal of switch 30 for controlling switch 30 to drive light emitting module 20 in a dimming on duration. Short circuit detection module 110 is coupled to the second terminal of switch 30, and is used for detecting if the light emitting module is shorted in a dimming off duration. Protection circuit 120 is coupled to the second terminal of switch 30 for providing the short circuit detection module with a suitable voltage according to working voltage VLED1 of the light emitting module. Driving module 100 comprises comparing circuit 101, enable switch 102, and resistor R102. Comparing circuit 101 is enabled during dimming on durations, and disabled during dimming off durations. Enable switch 102 is coupled to a third terminal of switch 30, and is used for enabling driving module 100 in dimming on durations. Resistor R102 is coupled between enable switch 102 and ground. Short circuit detection module 110 generates short circuit protection signal $V_{SCF}$ when the suitable voltage is greater than reference voltage $V_{REF}$. Short circuit detection module 110 further couples to the first terminal of switch 30 through voltage divided resistor R1. Protection circuit 120 forms a voltage dividing circuit with voltage divided resistor R1. The voltage dividing circuit is used for dividing working voltage VLED1 of the light emitting module at the first terminal so as to provide the suitable voltage. The voltage dividing circuit is disabled in dimming on durations.

Figure 2:
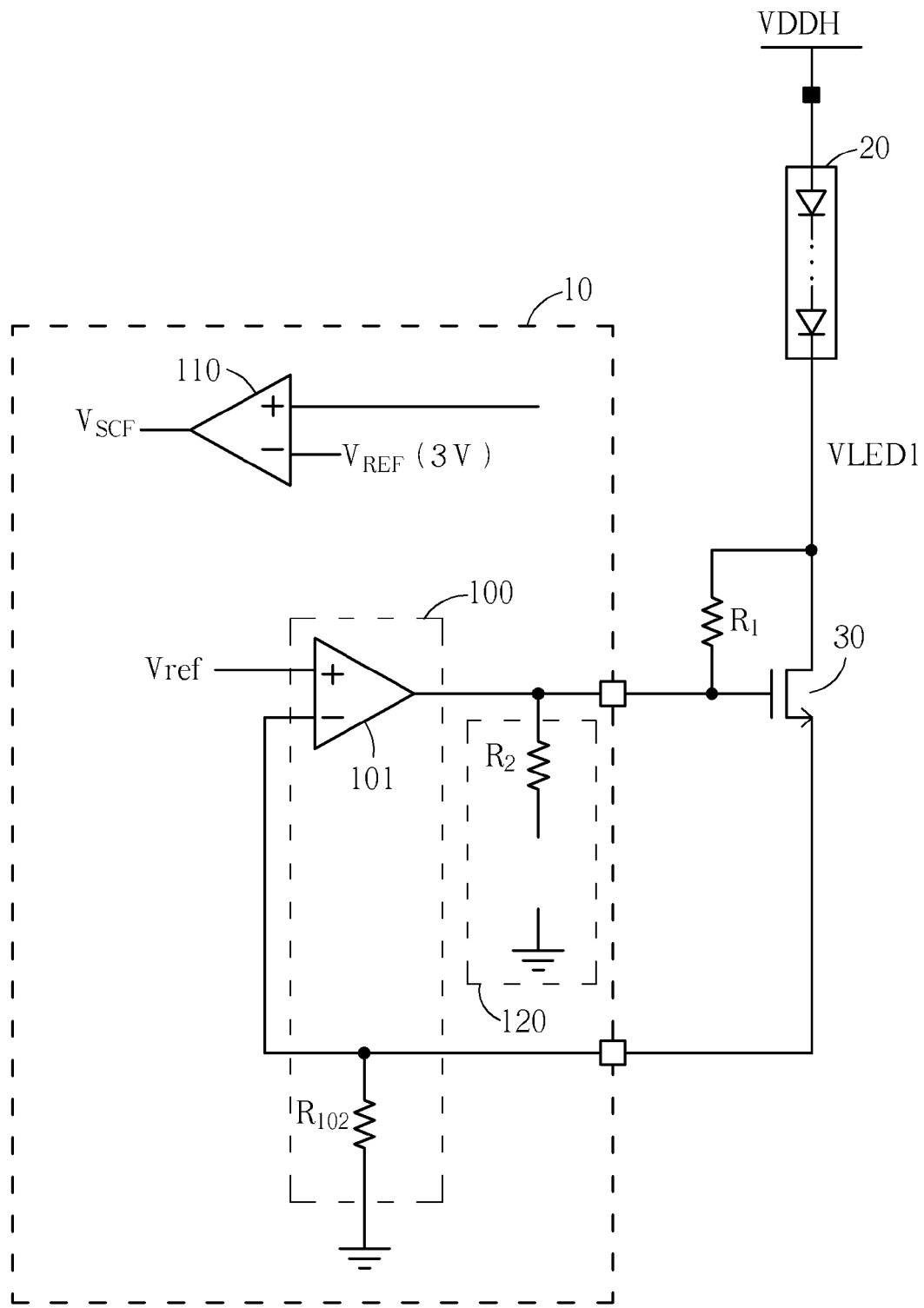
FIG. 2 is a diagram of light emitting module driving IC of FIG. 1 during dimming on durations.

Please refer to FIG. 2, which is a diagram of light emitting module driving IC 10 of FIG. 1 during dimming on durations. As shown in FIG. 1, dimming signal DIM controls operation of comparing circuit 101 and enable switch 102, and dimming bar signal DIM_b controls operation of enable switch 121 of protection circuit 120. Dimming signal DIM and dimming bar signal DIM_b may represent opposite polarity phases of a single signal. Thus, when dimming signal DIM is asserted, dimming bar signal DIM_b is unasserted; and, when dimming signal DIM is unasserted, dimming bar signal DIM_b is asserted. As shown in FIG. 2, during dimming on durations, dimming signal DIM is asserted, and dimming bar signal DIM_b is unasserted, such that comparing circuit 101 is enabled, enable switch 102 conducts, and enable switch 121 does not conduct. Thus, light emitting module driving IC 10 operates in current generation mode, driving switch 30 to output stable current to light emitting module 20. As enable switch 102 conducts, enable switch 102 shorts resistor R102 to driving switch 30. A feedback loop formed by comparing circuit 101 and switch 30 holds voltage across resistor R102 at reference voltage Vref, thereby stabilizing current through light emitting module 20. During dimming on durations, short circuit detection module 110 is effectively cut off from operation of light emitting module driving IC 10. Short circuit detection module 110 may receive a fixed voltage lower than reference voltage $V_{REF}$ during dimming on durations, or a control circuit that operates based on short circuit protection signal $V_{SCF}$ may disregard short circuit protection signal $V_{SCF}$ during dimming on durations.

Figure 3:
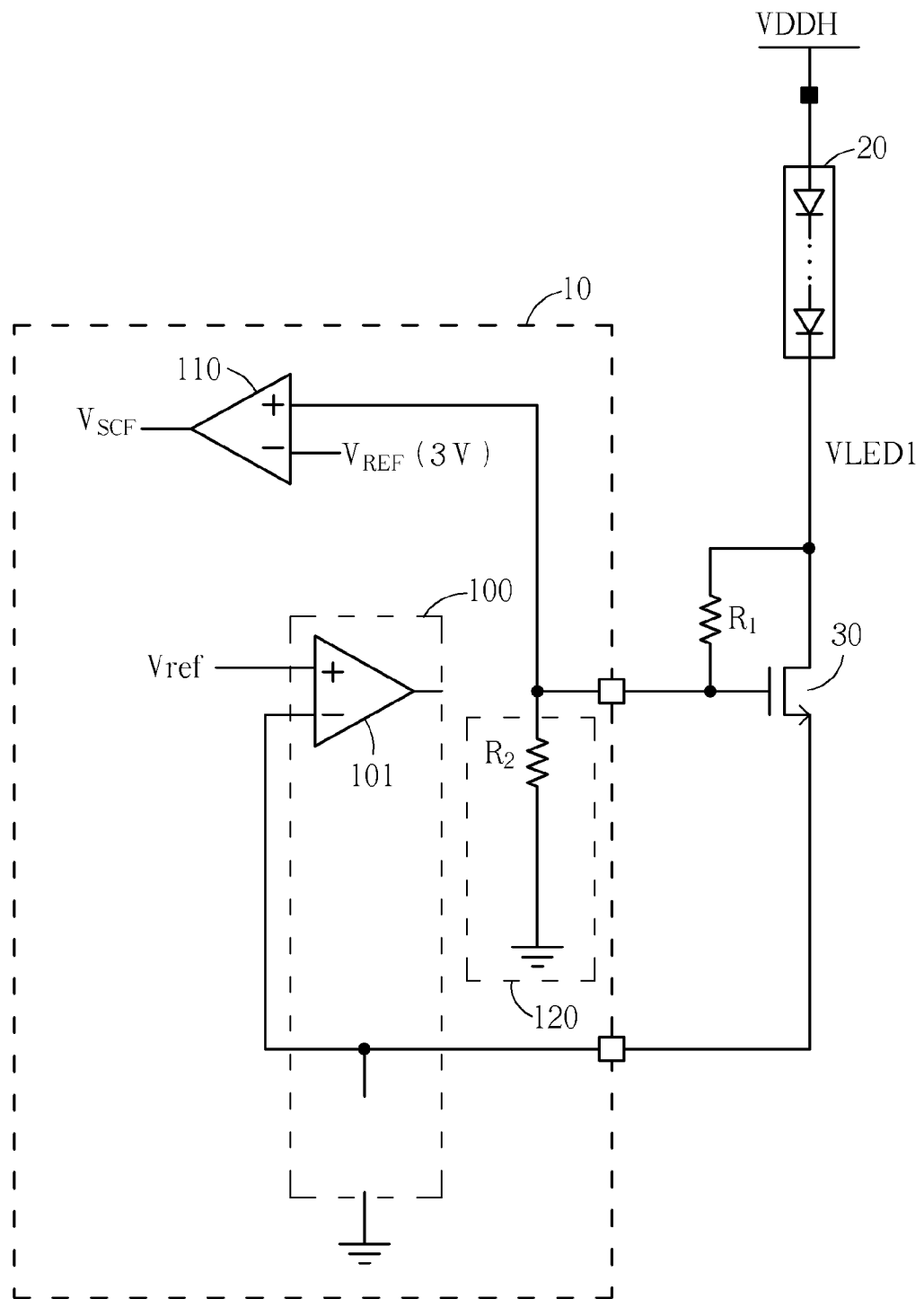
FIG. 3 is a diagram of light emitting module driving IC of FIG. 1 during dimming off durations.

Please refer to FIG. 3, which is a diagram of light emitting module driving IC 10 of FIG. 1 during dimming off durations. During dimming off durations, dimming bar signal DIM_b is asserted, and dimming signal DIM is unasserted, such that light emitting module driving IC 10 operates in short detection mode. Comparing circuit 101 is effectively disabled, enable switch 102 does not conduct, and enable switch 121 conducts. When enable switch 121 conducts, a suitable voltage is generated by voltage divided resistor R1 and resistor R2 of protection circuit 120. When a short circuit occurs in light emitting module 20, some or all of supply voltage VDDH is transferred directly to the first terminal of switch 30, which increases the suitable voltage. The suitable voltage is compared with reference voltage $V_{REF}$ by short circuit detection module 110 to assert short circuit protection signal $V_{SCF}$ when the suitable voltage exceeds reference voltage $V_{REF}$. During dimming off durations, a leakage current path passes through light emitting module 20. Thus, resistances of voltage divided resistor R1 and resistor R2 may be designed to be high enough that leakage current through light emitting module 20 during dimming off durations is not high enough to turn on light emitting module 20.

Figure 4:
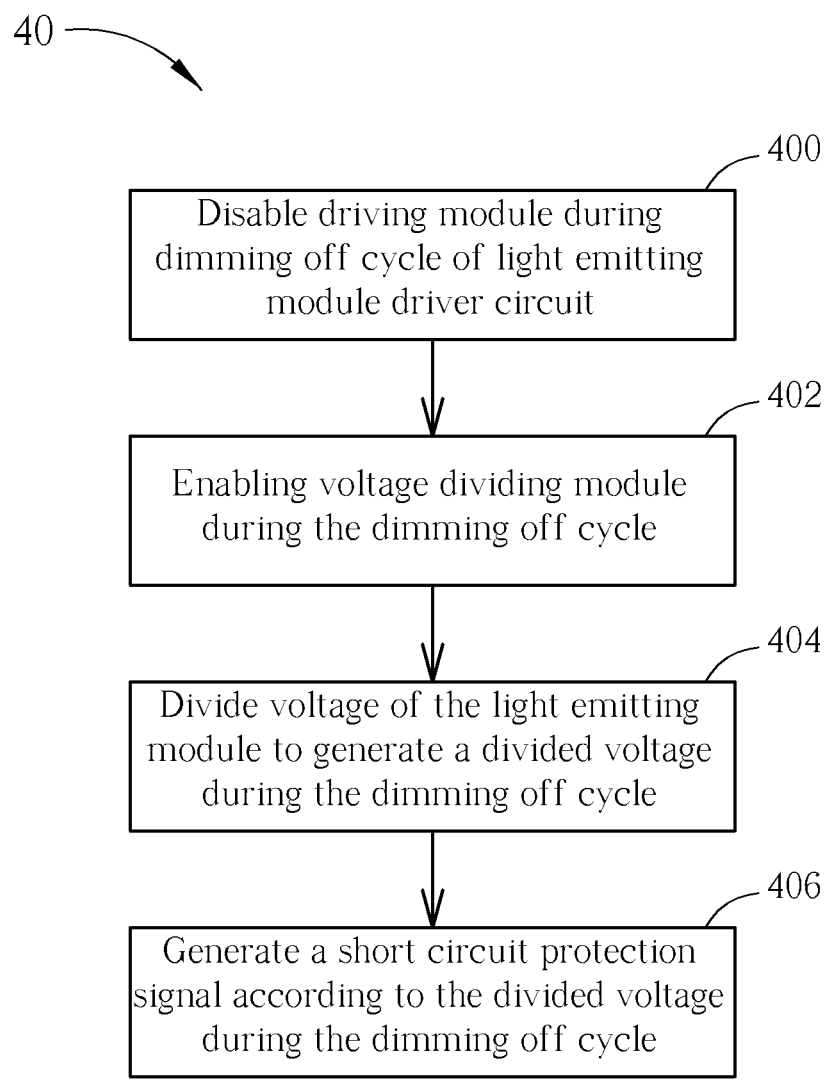
FIG. 4 is a flowchart of a process for performing short circuit protection in a light emitting module driver IC.

Please refer to FIG. 4, which is a flowchart of a process 40 for performing short circuit protection in a light emitting module driver IC, such as light emitting module driver IC 10 described above. The process 40 comprises the following steps:

Step 400: Disable a driving module during a dimming off cycle of a light emitting module driver circuit;

Step 402: Enable a voltage dividing module during the dimming off cycle;

Step 404: Divide voltage of the light emitting module to generate a divided voltage during the dimming off cycle; and Step 406: Generate a short circuit protection signal according to the divided voltage during the dimming off cycle.

In the above, generating the short circuit protection signal according to the divided voltage during the dimming off cycle (Step 406) comprises comparing the divided voltage with a reference voltage, and generating the short circuit protection signal when the divided voltage is greater than the reference voltage. As described above, short circuit protection signal $V_{SCF}$ is asserted when the suitable voltage exceeds reference voltage $V_{REF}$. Enabling the voltage dividing module during the dimming off cycle (Step 402) comprises receiving a dimming off signal, and turning on a switch of the voltage dividing module to couple a dividing element of the voltage dividing module to ground according to the dimming off signal. As shown in FIG. 3, when the dimming bar signal DIM_b is asserted, enable switch 121 conducts, which couples resistor R2 to ground. Disabling the driving module during the dimming off cycle (Step 400) comprises receiving a dimming on signal, and turning off a driving enable switch of the driving module coupled to a driving switch of the driving module according to the dimming on signal. As shown in FIG. 3, when the dimming signal DIM is unasserted during dimming off durations, enable switch 102 of driving module 100 does not conduct. Disabling the driving module during the dimming off cycle (Step 400) further comprises disabling a comparing circuit of the driving module coupled to the driving switch according to the dimming on signal. As shown in FIG. 3, when the dimming signal DIM is unasserted during dimming off durations, comparing circuit 101 is disabled.

Compared to the prior art, the proposed light emitting module driving IC 10 and related method perform short circuit detection during dimming off durations of light emitting module driving IC 10. Therefore, reliance on external, high voltage discrete components is reduced.

Those skilled in the art will readily observe that numerous modifications and alterations of the device and method may be made while retaining the teachings of the invention.

What is claimed is:

1. A method of performing short circuit protection in a light emitting module driver circuit utilized for driving a light emitting module, the light emitting module driver circuit comprising a voltage dividing module, a short circuit detection module, and a driving module, the method comprising:

disabling the driving module during a dimming off cycle of the light emitting module driver circuit;

enabling the voltage dividing module during the dimming off cycle;

dividing a voltage of the light emitting module to generate a divided voltage during the dimming off cycle; and generating a short circuit protection signal according to the divided voltage during the dimming off cycle.

2. The method of claim 1, wherein generating the short circuit protection signal according to the divided voltage during the dimming off cycle comprises:

comparing the divided voltage with a reference voltage; and generating the short circuit protection signal when the divided voltage is greater than the reference voltage.

3. The method of claim 1, wherein enabling the voltage dividing module during the dimming off cycle comprises:

receiving a dimming off signal; and turning on a switch of the voltage dividing module to couple a dividing element of the voltage dividing module to ground according to the dimming off signal.

4. The method of claim 1, wherein disabling the driving module during the dimming off cycle comprises:

receiving a dimming on signal; and turning off a driving enable switch of the driving module coupled to a driving switch of the driving module according to the dimming on signal.

5. The method of claim 4, wherein disabling the driving module during the dimming off cycle further comprises:

disabling a comparing circuit of the driving module coupled to the driving switch according to the dimming on signal.

6. A light emitting module driving integrated circuit (IC), used to drive a light emitting module through a switch having a first terminal coupled to the light emitting module, the light emitting module driving IC comprising:

a driving module coupled to a second terminal of the switch, for controlling the switch so as to drive the light emitting module in a dimming on duration;

a short circuit detection module coupled to the second terminal of the switch, used for detecting if the light emitting module is shorted in a dimming off duration; and a protection circuit coupled to the second terminal of the switch, for providing the short circuit detection module with a suitable voltage according to a working voltage of the light emitting module.

7. The light emitting module driving IC of claim 6, wherein the short circuit detection module generates the short circuit protection signal when the suitable voltage is greater than a reference voltage.

8. The light emitting module driving IC of claim 6, wherein the short circuit detection module further couples to the first terminal of the switch through a voltage divided resistor.

9. The light emitting module driving IC of claim 8, wherein the protection circuit and the voltage divided resistor form a voltage dividing circuit, used for dividing the working voltage of the light emitting module at the first terminal so as to provide the suitable voltage, and the voltage dividing circuit is disabled in the dimming on duration.

10. The light emitting module driving IC of claim 6, wherein the driving module comprises an enable switch coupled to a third terminal of the switch, used for enabling the driving module in the dimming on duration.

11. The light emitting module driving IC of claim 10, wherein the driving module comprises a comparing circuit, which is disabled in the dimming off duration.

* * * * *